United States Patent [19]

Dieck et al.

[11] Patent Number: 4,467,057

[45] Date of Patent: Aug. 21, 1984

[54] MODIFIED POLYESTER COMPOSITION

[75] Inventors: Ronald L. Dieck; Allen D. Wambach, both of Evansville, Ind.

[73] Assignee: General Electric Company, Pittsfield, Mass.

[21] Appl. No.: 473,352

[22] Filed: May 13, 1983

Related U.S. Application Data

[63] Continuation of Ser. No. 372,294, Apr. 27, 1982, abandoned, which is a continuation of Ser. No. 966,864, Dec. 6, 1978, abandoned.

[51] Int. Cl.$^3$ ............................................. C08K 00/00
[52] U.S. Cl. ..................... 523/212; 524/445; 524/447; 524/449; 524/451; 524/505
[58] Field of Search ............... 524/505, 539, 447, 449, 524/451; 523/212

[56] References Cited

U.S. PATENT DOCUMENTS

| | | | |
|---|---|---|---|
| 4,013,613 | 3/1977 | Abolins et al. ...................... | 524/513 |
| 4,013,624 | 3/1977 | Hoeschele ........................... | 528/300 |
| 4,031,165 | 6/1977 | Saiki et al. ......................... | 260/860 |
| 4,080,354 | 3/1978 | Kramer ............................... | 523/522 |
| 4,090,996 | 5/1978 | Gergen et al. ..................... | 524/505 |
| 4,111,893 | 9/1978 | Gasman et al. ..................... | 523/213 |
| 4,132,707 | 1/1979 | Borman .............................. | 528/273 |
| 4,203,887 | 5/1980 | Goedde et al. ..................... | 523/456 |

*Primary Examiner*—Lewis T. Jacobs
*Attorney, Agent, or Firm*—Hedman, Gibson, Costigan & Hoare

[57] ABSTRACT

Modified thermoplastic polyester compositions are provided which comprise (a) a poly(1,4-butylene terephthalate) resin or polyester copolymer and, optionally, a poly(ethylene terephthalate) resin, (b) a modifier therefor comprising a combination of a selectively hydrogenation monoalkenyl arene-diene block copolymer resin and an aromatic polycarbonate, and (c) a mineral filler and, optionally, (d) a flame retardant. Modifier (b) and mineral filler (c) provide enhanced resistance to impact fracture, increased strength and improved resistance to heat distortion in articles molded from the compositions.

16 Claims, No Drawings

MODIFIED POLYESTER COMPOSITION

This is a continuation of application Ser. No. 372,294 filed Apr. 27, 1982, which is in turn a continuation of application Ser. No. 966,864, filed Dec. 6, 1978 now abandoned.

This invention relates to modified thermoplastic polyester compositions which are moldable articles of improved impact strength and thermal resistance. More particularly, the invention pertains to compositions of (a) a poly(1,4-butylene terephthalate) resin or a polyester copolymer resin and, optionally, a poly(ethylene terphthalate) resin, which are modified with (b) an effective amount of a resinous combination comprising a selectively hydrogenated monoalkenyl arene-diene block copolymer and an aromatic polycarbonate and (c) a mineral filler and, optionally (d) a flame retardant.

BACKGROUND OF THE INVENTION

High molecular weight linear polyesters and copolyesters of glycols and terephthalic or isophthalic acid have been available for a number of years. These are described inter alia in Whinfield et al, U.S. Pat. Nos. 2,465,319 and in Pengilly, 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic/aliphatic or aliphatic polyesters are also known. See, copending application U.S. Ser. No. 752,325, filed Dec. 20, 1976, incorporated herein by reference. Such block copolyesters are useful per se as molding resins and also in intimate combination with poly(1,4-butylene terephthalate) and/or poly(ethylene terephthalate).

It has been proposed to increase the impact strengths of polyesters by adding various modifiers. For example, Brinkmann et al in U.S. Pat. No. 3,591,639 disclose that a useful family of modifiers comprises polyalkyl acrylates, methacrylates and/or ethacrylates. Barron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer having a glass temperature below −20° C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German Pat. No. 2,650,870) disclose an impact modifier combination comprising a blend of a polyurethane and an aromatic polycarbonate. Copending application Ser. No. 870,679, filed Jan. 19, 1978, discloses an impact modifier combination comprising a segmented block copolyester and an aromatic polycarbonate. Copending application Ser. No. 957,801, filed Nov. 6, 1978 discloses an impact modifier combination comprising a blend of a polyalkylacrylate and an aromatic polycarbonate. Gergen et al, U.S. Pat. No. 4,090,996 disclose an impact modifier combination comprising a selectively hydrogenated monoalkenyl arene-diene block copolymer, and an engineering thermoplastic, e.g., poly(aryl ether), poly(aryl sulfone), polycarbonate, acetal, etc. All of the foregoing patents and the application are incorporated herein by reference.

Although filled and/or reinforced modifications of the foregoing are described in the above-mentioned references, they lack one or more desirable attributes, when molded.

It has now been discovered that such polyesters can be greatly improved in impact strength as molded as well as after annealing and at −20° F., by intimately admixing therewith an impact improving modifier combination comprising a selectively hydrogenated monoalkenyl arene-diene block copolymer resin and an aromatic polycarbonate resin and a mineral filler. As will be shown hereinafter, compositions according to this invention have moderate shrink and reduced warp. They can be produced more readily in a variety of colors. As will also be shown, the new compositions of this invention can also be rendered flame-retardant.

DESCRIPTION OF THE INVENTION

According to this invention, there are provided thermoplastic compositions which are useful for molding, e.g., injection molding, compression molding, transfer molding, and the like, the compositions comprising:

(a) a polyester comprising:

(i) a poly(1,4-butylene terephthalate) resin;

(ii) a blend of a poly(1,4-butylene terephthalate) resin and a poly(ethylene terephthalate) resin;

(iii) a block copolyester of poly(1,4-butylene terephthalate) and an aromatic/aliphatic or aliphatic polyester;

(iv) a blend of (iii) and a poly(ethylene terephthalate) resin; or (v) a blend of (iii) and a poly(1,4-butylene terephthalate) resin;

(b) an impact modifier therefor comprising a combination of:

(i) a selectively hydrogenated monoalkenyl arene-diene block copolymer; and (ii) an aromatic polycarbonate resin, in an amount of up to 60 parts per 100 parts by weight of (a) and (b) together; and (c) an effective amount of a mineral filler therefor.

The polyester resins (a) of the compositions of this invention are available commercially or can be prepared by known techniques such as by the alcoholysis of esters of terephthalic acid with ethylene glycols with the free acids or with halide derivatives thereof, and similar processes. These are described in U.S. Pat. Nos. 2,465,319, and 3,047,539, and elsewhere. As has been mentioned, preparation of the block copolyesters is described in Borman, Dolce and Kramer, U.S. Ser. No. 752,325, filed Dec. 20, 1976, and incorporated herein by reference.

Illustratively, the high molecular weight polyesters will have an intrinsic viscosity of at least about 0.4 deciliters/gram and preferably, at least 0.6 deciliters/gram as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

Impact modifier (b) comprises a combination of (i) a selectively hydrogenated monoalkenyl arene-diene block copolymer resin and (ii) an aromatic polycarbonate. The block copolymer resins(b)(i) can be made in known ways and they are available commercially from Shell Oil Company, under the trade designation Kraton, and from Phillips Chemical Co., under the trade designation Solprene. Resins in U.S. Pat. No. 4,090,996 can be used, especially those containing units in the linear ABA structure or in the radial A—B—A teleblock structure, derived from styrene and butadiene or isoprene. Especially preferably, the block copolymer will comprise a selectively hydrogenated block copolymer of styrene and butadiene, the butadiene having a 1,2 content of between about 35% and 55%. The polycarbonate resins (b)(ii) can be made in known ways and they are available commercially from sources, e.g., General Electric Company, Pittsfield, Mass., U.S.A., under the trademark LEXAN. In general, any of the aromatic polycarbonates described in Baron et al, U.S. Pat. No. 4,034,016 can be used, especially those including units derived from bisphenol-A.

The fillers will comprise mineral fillers, such as clay, mica, talc and the like and preferably clay, and especially that form of clay known as calcined kaolin. The fillers can be combined with reinforcing fillers, such as fibrous glass and the like. The fillers can be untreated, but preferably, they will be treated with silane or titanate coupling agents, etc. Especially preferred is kaolin clay surface treated with a silane coupling agent known as gamma aminopropyl triethoxysilane and sold by Union Carbide Corp., under the trade designation A-1100 (GAP). The coupling agent can be applied to the mineral filler by several means. It can be tumble blended, or it can be deposited, e.g., from solution in aqueous methanol.

The amount of the filler can vary widely depending on the formulation and needs of the particular composition. Preferably, however, the mineral filler will comprise from about 1 to about 90%, preferably from about 2 to about 40% by weight of filler (c) and (a) and (b), combined. Especially preferably the filler will comprise less than about 35 by weight of the combination.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of block copolymer to aromatic polycarbonate can vary widely, i.e., within the range of 1 to 99 parts of the former to, correspondingly, 99 to 1 parts of the latter, but in general, from 60 to 40 parts of the block copolymer will be present for each 40 to 60 parts of the aromatic polycarbonate per 100 parts by weight of (b).

The impact modified polyesters in combination with a filler can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units; see, for example, Wambach, U.S. Pat. No. 3,833,685, which is incorporated herein by reference.

Other ingredients, such as dyes, pigments, drip retardants, and the like can be added for their conventionally employed purposes.

The compositions of this invention can be prepared by a number of procedures. In one way, the modifier and mineral filler or fire retardants is put into an extrusion compounder with resinous components to produce molding pellets. The modifier and mineral filler is dispersed in a matrix of the resin in the process. In another procedure, the modifier and mineral filler is mixed with the resins by dry blending, then either fluxed on a mill and comminuted, or then are extruded and chopped. The modifying agent and mineral filler can also be mixed with the resins and directly molded, e.g., by injection or transfer molding techniques.

It is always important to thoroughly free all of the ingredients; resin, modifier, mineral filler, and any optional, conventional additives from as much water as possible.

In addition, compounding should be carried out to ensure that the residence time in the machine is short; the temperature is carefully controlled; the friction heat is utilized; and an intimate blend between the resin, the modifier and the filler is obtained.

Although it is not essential, best results are obtained if the ingredients are pre-compounded, pelletized and then molded. Pre-compounding can be carried out in conventional equipment. For example, after carefully pre-drying the polyester and modifier and the mineral filler, e.g., 4 hours at 250° F., a single screw vacuum vented extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and mineral down stream. In either case, a generally suitable machine temperature will be about 450° to 560° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–535° F. and conventional mold temperatures, e.g., 130°–200° F.

DESCRIPTION OF THE PREFERRED EMBODIMENTS

The following examples illustrate the invention. They are set forth as a further description but are not to be construed as limiting the invention thereto. In the data tables, the abbreviation "N.D." means not determined. All parts are by weight

EXAMPLES 1–3

Dry blends of poly(1,4-butylene terephthalate) resin (PBT), hydrogenated block copolymer of styrene and butadiene, aromatic polycarbonate of bisphenol-A and phosgene, mineral filler and mold release/stabilizer are compounded and extruded at 520° F. in an extruder. The extrudate is pelletized and injection molded at 520° F. (mold temperature 150° F.). The formulations and physical properties are shown in Table 1.

TABLE 1

Compositions Comprising Polyester, Block Copolymer, Aromatic Polycarbonate and Clay

| Example | 1 | 2 | 3 |
|---|---|---|---|
| Composition (parts by weight) | | | |
| Poly(1,4-butylene terephthalate)[a)(i)] | 47.6 | | |
| Poly(1,4-butylene terephthalate)[a)(ii)] | | 47.6 | 38.0 |
| S-B-S Block copolymer[b)(i)] | 7.5 | 7.5 | 15 |
| Aromatic polycarbonate[b)(ii)] | 15.0 | 15.0 | 15 |
| Satintone clay[c)] | 29.7 | 29.7 | 30 |
| Mold release stabilizers (to make 100%) | | | |
| Properties | | | |
| Notched Izod impact, ft. lbs./in. | 1.83 | 2.18 | 1.14 |
| Unnotched Izod impact, ft. lbs. 1/8" | 42.5 | 43.4 | 15.7 |
| Flexural strength, psi | 13,010 | 12,890 | 10,404 |
| Flexural modulus, psi | 493,420 | 475,180 | 452,250 |
| Tensile strength, psi | 7,160 | 7,240 | 5,620 |
| Elongation, % | 24 | 29 | 10.7 |

[a)(i)]Valox 300, General Electric Co., melt viscosity 2,300–3,800 poise.
[a)(ii)]Valox 315, General Electric Co., melt viscosity 7,250–9,000 poise
[b)(i)]Kraton G 1651, Shell Chemical Co., A-B-A linear selectively hydrogenated styrene-butadiene-styrene block copolymer
[b)(ii)]LEXAN 105, General Electric Co.
[c)]Englehard Co., New Jersey U.S.A. treated with 0.13% by weight of A-1100, gammaaminopropyltriethoxysilane coupling agent The compositions according to this invention exhibit excellent impact strength and other properties.

EXAMPLES 4–11

The general procedure of Example 1 is used to make compositions of poly(1,4-butylene terephthalate), S—B—S block copolymer, aromatic polycarbonate and clay. The formulations used and the properties obtained are set forth in Table 2.

TABLE 2

Compositions Comprising Polyester, Block Copolymer, Polycarbonate and Clays

| Example | 4 | 5 | 6 | 7 | 8 | 9 | 10 | 11 |
|---|---|---|---|---|---|---|---|---|
| Composition (parts by weight) | | | | | | | | |
| Poly(1,4-butylene terephthalate)[a)(iii)] | 42.3 | 37.3 | 53.5 | 53.5 | 59.9 | 47.3 | 47.3 | 47.3 |
| S-B-S Block copolymer[b)(i)] | 11.3 | 11.3 | 11.3 | 5.0 | 5.0 | 11.3 | 7.5 | 15.0 |
| Aromatic Polycarbonate[b)(ii)] | 11.3 | 11.3 | 5.0 | 11.3 | 5.0 | 11.3 | 15.0 | 7.5 |
| Clay[c)] | 35.0 | 40.0 | 30.0 | 30.0 | 29.9 | 30.0 | 30.0 | 30.0 |
| Mold release/stabilizer (to make 100%) | | | | | | | | |
| Properties | | | | | | | | |
| Distortion temp. under load, °F. at 264 psi | 185 | 196 | N.D. | 182 | N.D. | N.D. | 192 | N.D. |
| Warpage, room temp. | <1 | <1 | <1 | <1 | <1 | <1 | <1 | <1 |
| Warpage, 350° F., 30" | 8.7 | 7.7 | 8.7 | 8.7 | 6.7 | 9.3 | 10.0 | 11.3 |
| Notched Izod, ft. lbs./in. | 1.52 | 1.32 | 1.65 | 1.52 | 1.32 | 1.57 | 1.75 | 1.60 |
| Unnotched Izod, ft. lbs./in. | 24.3 | 22.6 | 21.0 | 36.8 | 34.0 | 36 | 49 | 27.5 |
| Flexural strength, psi | 12,100 | 12,400 | 12,400 | 14,600 | 14,500 | 12,300 | 14,200 | 10,500 |
| Flexural modulus, psi | 537,000 | 593,000 | 494,000 | 563,000 | 583,000 | 510,000 | 586,000 | 441,000 |
| Tensile strength, psi | 6410 | 6410 | 6150 | 7940 | 7840 | 6460 | 7360 | 5410 |
| % elongation | 15 | 22 | 23 | 21 | 19 | 24 | 23 | 29 |
| Shrinkage, mils/in. | 9.4 | 10.1 | 13.0 | 10.7 | 12.9 | 11.3 | 10.7 | 13.0 |

[a)(iii)]Valox 310, General Electric Co., melt viscosity 5,000–7,500 poise
[b)(i)]See Table 1
[c)]Translink 445 Clay, Freeport Kaolin
[b)(ii)]Lexan 105, General Electric Co.

The compositions of this invention are seen to exhibit excellent impact strength, low warpage and low mold shrinkage.

EXAMPLES 12–21

The general procedure of Example 1 is used to make compositions of poly(1,4-butylene terephthalate), optionally, poly(ethylene terephthalate), S—B—S block copolymer, aromatic polycarbonate and several different mineral fillers. The formulations used and the properties obtained are set forth in Table 3.

TABLE 3

Compositions Comprising Polyesters, S-B-S Block Copolymers, Polycarbonates and Mineral Fillers

| Example | 12 | 13 | 14 | 15 | 16 | 17 | 18 | 19 | 20 | 21 |
|---|---|---|---|---|---|---|---|---|---|---|
| Composition (parts by weight) | | | | | | | | | | |
| Poly(1,4-butylene terephthalate)[a)(iii)] | — | — | — | — | — | — | — | 47.3 | 47.2 | 47.2 |
| Poly(1,4-butylene tere- | 39.8 | 24.8 | 58.2 | 43.2 | — | — | — | — | — | — |

TABLE 3-continued

Compositions Comprising Polyesters, S-B-S Block Copolymers, Polycarbonates and Mineral Fillers

| Example | 12 | 13 | 14 | 15 | 16 | 17 | 18 | 19 | 20 | 21 |
|---|---|---|---|---|---|---|---|---|---|---|
| phthalate[a][ii] | | | | | | | | | | |
| Poly(1,4-butylene terephthalate)[a][i] | — | — | — | — | 47.3 | 47.4 | 47.5 | — | — | — |
| Poly(ethylene terephthalate) | — | 15 | — | 15 | — | — | — | — | — | — |
| S-B-S block copolymer[b][i] | 15 | 15 | 15 | 15 | 7.5 | 7.5 | 7.5 | 7.5 | 7.5 | 7.5 |
| Aromatic polycarbonate[b][ii] | 15 | 15 | 15 | 15 | 15.0 | 15.0 | 15.0 | 15.0 | 15.0 | 15.0 |
| Translink clay | — | — | — | — | 30.0 | — | — | 29.7 | — | — |
| Santintone clay[c] | 30 | 30 | 10 | 10 | — | 29.9 | 29.8 | — | 29.7 | — |
| Suzorite mica (80S) | — | — | — | — | — | — | — | — | — | 29.9 |
| Stabilizer/mold release (to make 100%) | | | | | | | | | | |
| Properties | | | | | | | | | | |
| Distortion temp. under load, °F. at 264 psi | 190 | 182 | 156 | 153 | 183 | 180 | 186 | N.D. | N.D. | N.D. |
| Warpage, room temp. | N.D. | N.D. | N.D. | N.D. | <1 | <1 | N.D. | <1 | <1 | <1 |
| Warpage, 350° F., 30" | N.D. | N.D. | N.D. | N.D. | 10 | 12.3 | N.D. | 10.0 | 8.7 | <1 |
| Notched Izod, ft. lbs./in. | 1.14 | 1.14 | 16.2(⅛") | 17.0(⅛") | 1.27 | 1.70 | 1.56 | 1.27 | 1.91 | 0.58 |
| Unnotched Izod, ft. lbs./in. | 16.4 | 15.7 | >20 | >20 | 28.6 | 32.6 | 37.6 | 27.2 | 48.2 | 7.2 |
| Flexural strength, psi | 10,200 | 10,400 | 11,000 | 8,800 | 12,970 | 12,970 | 12,800 | 12,800 | 13,100 | 14,600 |
| Flexural modulus, psi | 433,000 | 452,000 | 286,000 | 282,000 | 498,000 | 498,000 | 501,000 | 508,400 | 516,000 | 740,800 |
| Tensile strength, psi | 5,540 | 5,630 | 5,600 | 5,375 | 7,136 | 7,085 | 7,010 | 7,025 | 7,085 | 7,930 |
| % elongation | 17.9 | 10.7 | 137 | 125 | 20.3 | 27.4 | 26.7 | 19.6 | 28.8 | 10.8 |
| Shrinkage, mils./in. | 9.7 | 8.7 | N.D. | N.D. | 9.4 | 9.5 | 9.2 | N.D. | N.D. | N.D. |

[a][i] Valox 300 (Table 1)
[a][ii] Valox 315 (Table 1)
[a][iii] Valox 310
[b][i]; [b][ii] See Table 1
[c] Also includes A-1100 coupling agent The compositions have especially excellent impact strength, and poly(ethylene terephthalate) can replace at least part of the poly(1,4-butylene terephthalate).

EXAMPLES 22–31

Impact modified, mineral filled compositions are prepared by the general procedure of Example 1. The formulations and results are set forth in Table 4.

TABLE 4

Compositions Comprising Polyester, Block Copolymer, Polycarbonate and Mineral Filler

| Example | 22 | 23 | 24 | 25 | 26 |
|---|---|---|---|---|---|
| Composition (parts by weight) | | | | | |
| Poly(1,4-butylene terephthalate)[a] | 47.1 | 47.3 | 47.2 | — | — |
| Poly(1,4-butylene terephthalate)[a][i] | — | — | — | 47.2 | 47.2 |
| Poly(1,4-butylene terephthalate)[a][ii] | — | — | — | — | — |
| Block copolymer | | | | | |
| S-B-S linear[b][i] | 11.2 | 11.3 | 7.5 | 7.5 | 7.5 |
| S-B-S radial teleblock[b][i]' | — | — | — | — | — |
| S-B-S radial teleblock[b][i]'' | — | — | — | — | — |
| Aromatic polycarbonate[c] | — | — | 15.0 | — | 15.0 |
| Aromatic polycarbonate[c]' | 11.2 | 11.3 | — | — | — |
| Aromatic polycarbonate[c]'' | — | — | — | 15.0 | — |
| Translink 445 Clay | — | 30.0 | — | — | — |
| Minex 10 silicate | 29.9 | — | — | — | — |
| Satintone clay | — | — | 29.7 | 29.7 | 29.7 |
| Stabilizer/mold release (conventional quantity) | | | | | |
| Properties | | | | | |
| Distortion temp. under load, °F. 264 psi | 158 | 182 | N.D. | N.D. | N.D. |
| Warpage, room temp. | <1 | <1 | <1 | <1 | <1 |
| Warpage 350° F./30" | 13 | 10 | 14 | 10.3 | 8.7 |
| Notched Izod ft. lbs./in. | 1.6 | 1.7 | 1.8 | 1.8 | 1.6 |
| Unnotched Izod ft. lbs./in. | 45 | 46 | 37 | 41 | 43 |
| Flexural strength, psi | 11,120 | 11,800 | 12,665 | 12,700 | 12,700 |
| Flexural modulus, psi | 417,000 | 452,000 | 475,000 | 491,000 | 495,000 |
| Tensile strength, psi | 6130 | 6255 | 7285 | 7165 | 7030 |
| % elongation | 45 | 32 | 24 | 29 | 31 |
| Shrink, mils./in. | 10.5 | 10.0 | N.D. | N.D. | N.D. |

| Example | 27 | 28 | 29 | 30 | 31 |
|---|---|---|---|---|---|
| Composition (parts by weight) | | | | | |
| Poly(1,4-butylene terephthalate)[a] | 47.2 | — | — | — | — |
| Poly(1,4-butylene terephthalate)[a][i] | — | 47.3 | 47.3 | — | — |
| Poly(1,4-butylene terephtha- | — | — | — | 47.3 | 47.3 |

TABLE 4-continued

Compositions Comprising Polyester, Block Copolymer, Polycarbonate and Mineral Filler late[a]

Block Copolymer

| | | | | | |
|---|---|---|---|---|---|
| S-B-S linear[b][i] | 7.5 | — | — | — | — |
| S-B-S radial teleblock[b][i]' | — | 7.5 | — | — | 7.5 |
| S-B-S radial teleblock[b][i]" | — | — | 7.5 | 7.5 | — |
| Aromatic polycarbonate[c] | — | 15.0 | 15.0 | 15.0 | 15.0 |
| Aromatic polycarbonate[c]' | — | — | — | — | — |
| Aromatic polycarbonate[c]" | 15.0 | — | — | — | — |
| Translink 445 clay | — | — | — | — | — |
| Minex 10 silicate | — | — | — | — | — |
| Satintone clay | 29.7 | 29.7 | 29.7 | 29.7 | 29.7 |
| Stabilizer/mold release (to make 100%) | | | | | |
| Properties | | | | | |
| Distortion temp. under load, °F. 264 psi | N.D. | N.D. | N.D. | N.D. | N.D. |
| Warpage, room temp. | <1 | N.D. | N.D. | N.D. | N.D. |
| Warpage, 350° F./30" | 6.3 | N.D. | N.D. | N.D. | N.D. |
| Notched Izod ft. lbs./in. | 1.9 | 1.1 | 1.0 | 1.6 | 1.0 |
| Unnotched Izod ft. lbs./in. | 64 | 29 | 23 | 31 | 20 |
| Flexural strength, psi | 12,700 | N.D. | N.D. | N.D. | N.D. |
| Flexural modulus, psi | 494,000 | N.D. | N.D. | N.D. | N.D. |
| Tensile strength, psi | 7085 | 7300 | 6850 | 7100 | 7650 |
| % elongation | 36 | 12 | 12 | 20 | 7.5 |
| Shrink, mils./in. | N.D. | N.D. | N.D. | N.D. | N.D. |

[a]Valox 300
[a][i]Valox 310
[a][ii]Valox 295, General Electric Co., melt viscosity, 1200–1800 poise
[b][i]Kraton G-1651
[b][i]'Solprene 512
[b][i]"Solprene 414p
[c]Lexan 125
[c]'Lexan 105
[c]"Lexan 145

EXAMPLES 32–36

Impact modified, mineral filled compositions are prepared according to the general procedure of Example 1. The level of coupling agent on the clay is varied to monitor its effect on ultimate properties. the formulations and results are set forth in Table 5.

TABLE 5

Compositions Comprising Polyester, S-B-S Block Copolymer, Aromatic Carbonate, Clays and Coupling Agent

| Example | 32 | 33 | 34 | 35 | 36 |
|---|---|---|---|---|---|
| Composition (parts by weight) | | | | | |
| Poly(1,4-butylene terephthalate)[a] | 47.4 | 47.3 | 47.3 | 47.3 | 47.2 |
| S-B-S Block Copolymer[b][i] | 7.5 | 7.5 | 7.5 | 7.5 | 7.5 |
| Aromatic Polycarbonate[b][ii] | 15.0 | 15.0 | 15.0 | 15.0 | 15.0 |
| Satintone Clay | 29.7 | 29.7 | 29.6 | 29.6 | 29.6 |
| Coupling agent: gammoaminopropyltriethoxysilane[e] | 0.20 | 0.30 | 0.40 | 0.50 | 0.60 |
| Mold release/stabilizer (to 100% by weight) | | | | | |
| Properties | | | | | |
| Notched Izod impact strength, ft. lbs/in. | 1.4 | 1.5 | 1.6 | 1.8 | 1.7 |
| Unnotched Izod impact strength, ft. lbs./in. | 45 | 46 | 51 | 45 | 51 |

[a]Valox 300
[b][i]Kraton G1651
[b][ii]Lexan 145
[e]A-1100 Union Carbide

The amount of coupling agent, based on clay, can be varied within the range of 0.66 to 2% without materially affecting the impact strength.

EXAMPLES 37–38

Fire retarded, impact modified, mineral filled compositions are prepared by the general procedure of Example 1. The formulations and results are set forth in Table 6.

TABLE 6

Compositions Comprising Polyester, S-B-S Block Copolymer, Aromatic Carbonate, Clays, and Fire Retardant

| Example | 37 | 38 |
|---|---|---|
| Composition (parts by weight) | | |
| Poly(1,4-butylene terephthalate)[a] | 41.7 | 38.5 |
| S-B-S Block Copolymer[b][i] | 6.7 | 6.1 |
| Aromatic Polycarbonate[b][ii] | 13.3 | 12.2 |
| Satintone Clay | 24.7 | 29.6 |
| Decabromodiphenylether | 7.0 | 7.0 |
| Antimony oxide | 6.0 | 6.0 |
| Stabilizer/mold release (to give 100%) | | |
| Properties | | |
| Notched Izod, ft. lbs./in. | 1.2 | 0.81 |
| Unnotched Izod, ft. lbs./in. | 13.1 | 9.1 |
| Flexural strength, psi | 12,900 | 13,700 |
| Flexural modulus, psi | 520,000 | 590,000 |

TABLE 6-continued

Compositions Comprising Polyester, S-B-S Block Copolymer, Aromatic Carbonate, Clays, and Fire Retardant

| Example | 37 | 38 |
|---|---|---|
| Tensile strength, psi | 7,300 | 7,500 |
| Uh 94 Flammability test 30 mil. sample | V-O | V-O |

(a)VALOX 315 resin
(b)(i)Kraton G-1-51
(b)(ii)Lexan

Obviously, other modifications and variations of the present invention are possible in the light of the above teachings. For example, the mineral filled compositions can be rendered flame retardant, and the poly(1,4-butylene terephthalate) and/or poly(ethylene terephthalate) can be replaced with a copolyester. It is therefore, to be understood that changes may be made in the particular embodiments described above which are within the scope of the invention as defined in the appended claims.

We claim:

1. A thermoplastic composition comprising:
   (a) a polyester composition comprising:
      (i) a block copolyester of poly(1,4-butylene terephthalate) and an aromatic/aliphatic or aliphatic polyester;
      (ii) a blend of (i) and a poly(ethylene terephthalate) resin; or
      (iii) a blend of (i) and a poly(1,4-butylene terephthalate) resin;
   (b) an impact modifier therefor comprising a combination of:
      (i) a selectively hydrogenated monoalkenyl arene-diene block copolymer resin; and
      (ii) an aromatic polycarbonate resin, in an amount of from at least about 1.0 up to 60 parts per 100 parts by weight of (a) and (b) together; and
   (c) an effective amount of a mineral filler therefor selected from the group consisting of clay, mica and talc.

2. A composition as defined in claim 1 wherein the modifier (b) is present in an amount of from about 2.5 to about 50 parts by weight per 100 parts by weight of (a) and (b) together.

3. A composition as defined in claim 1 wherein the mineral filler (c) comprises calcined kaolin clay.

4. A composition as defined in claim 4 wherein said clay filler is a silane coupling agent surface-treated clay.

5. A composition as defined in claim 1 wherein said mineral filler is present in an amount of from about 1 to about 60 parts by weight per 100 parts by weight of (a), (b) and (c) together.

6. A composition as defined in claim 1 wherein each said polyester in component (a) has an intrinsic viscosity of at least about 0.4 deciliters/gram when measured in a solution in a 60:40 mixture of phenol and trichloroethane at 30° C.

7. A composition as defined in claim 6 wherein each said polyester in component (a) has an intrinsic viscosity of at least about 0.6 deciliters per gram when measured in a solution in a 60:40 mixture of phenol and trichloroethane at 30° C.

8. A composition as defined in claim 1 wherein in components (a) (i) and (a) (iii), said poly(1,4-butylene terephthalate) resin is linear or branched.

9. A composition as defined in claim 8 wherein said branched polyester is a high melt viscosity (1,4-butylene terephthalate) resin which includes a small amount of a branching component containing at least three ester forming groups.

10. A composition as defined in claim 1 wherein in said block copolymer resin component (b) (i), the monoalkenyl arene is styrene and the conjugated diene is butadiene or isoprene.

11. A composition as defined in claim 10 wherein said block copolymer has a ABA linear structure.

12. A composition as defined in claim 11 wherein said block copolymer is a selectively hydrogenated block copolymer of styrene and butadiene, said butadiene having a 1,2 content of between about 35% and 55%.

13. A composition as defined in claim 10 wherein said block copolymer has a radial ABA teleblock structure.

14. A composition as defined in claim 1 wherein said aromatic polycarbonate resin includes units derived from bisphenol-A.

15. A composition as defined in claim 1 which also includes (d) a flame-retardant amount of a flame retarding agent.

16. A composition as defined in claim 15 wherein component (d) comprises a brominated diphenyl ether.

* * * * *